United States Patent
Nozoe et al.

(10) Patent No.: US 9,062,411 B2
(45) Date of Patent: Jun. 23, 2015

(54) SILICONE RUBBER COMPOSITION FOR COATING FOR WOVEN FABRIC, AND COATED WOVEN FABRIC

(75) Inventors: Tsugio Nozoe, Chiba (JP); Yuichi Tsuji, Chiba (JP); Shinichi Yamamoto, Chiba (JP)

(73) Assignee: DOW CORNING TORAY COMPANY, LTD., Chiyoda-Ku, Tokyo (JP)

( * ) Notice: Subject to any disclaimer, the term of this patent is extended or adjusted under 35 U.S.C. 154(b) by 1427 days.

(21) Appl. No.: 12/376,873

(22) PCT Filed: Aug. 9, 2007

(86) PCT No.: PCT/JP2007/065929
§ 371 (c)(1),
(2), (4) Date: Apr. 8, 2010

(87) PCT Pub. No.: WO2008/020605
PCT Pub. Date: Feb. 21, 2008

(65) Prior Publication Data
US 2010/0190395 A1    Jul. 29, 2010

(30) Foreign Application Priority Data

Aug. 14, 2006 (JP) .................................. 2006-221237

(51) Int. Cl.
| | | |
|---|---|---|
| B32B 5/02 | (2006.01) | |
| D06M 15/643 | (2006.01) | |
| C08L 83/04 | (2006.01) | |
| D06M 11/79 | (2006.01) | |
| D06M 13/513 | (2006.01) | |
| D06N 3/12 | (2006.01) | |
| B60R 21/235 | (2006.01) | |
| C08G 77/12 | (2006.01) | |
| C08G 77/20 | (2006.01) | |
| C08K 3/36 | (2006.01) | |
| C08K 5/56 | (2006.01) | |

(52) U.S. Cl.
CPC .... D06M 15/643 (2013.01); B60R 2021/23514 (2013.01); C08G 77/12 (2013.01); C08G 77/20 (2013.01); C08K 3/36 (2013.01); C08K 5/56 (2013.01); C08L 83/04 (2013.01); D06M 11/79 (2013.01); D06M 13/513 (2013.01); D06N 3/128 (2013.01)

(58) Field of Classification Search
CPC ................... C08L 83/04; C08L 83/00; B60R 2021/23514; C08G 77/12; C08G 77/20; C08K 5/56
USPC ......................................................... 442/157
See application file for complete search history.

(56) References Cited

U.S. PATENT DOCUMENTS

| | | | | |
|---|---|---|---|---|
| 5,006,580 A | * | 4/1991 | Kasuya et al. | 524/264 |
| 5,529,837 A | * | 6/1996 | Fujiki et al. | 442/136 |
| 5,625,022 A | * | 4/1997 | Onishi | 528/15 |
| 6,569,788 B1 | | 5/2003 | Hurst et al. | |
| 6,709,752 B1 | | 3/2004 | James et al. | |
| 2003/0162875 A1 | * | 8/2003 | Aketa et al. | 524/425 |
| 2004/0222618 A1 | * | 11/2004 | Azechi et al. | 524/861 |
| 2005/0267257 A1 | * | 12/2005 | Mizushima et al. | 524/861 |
| 2007/0100065 A1 | * | 5/2007 | Iwata et al. | 524/588 |
| 2007/0166555 A1 | * | 7/2007 | Ikeno et al. | 428/447 |

FOREIGN PATENT DOCUMENTS

| | | |
|---|---|---|
| EP | 2053161 A1 | 4/2009 |
| JP | 11001876 A | 1/1999 |
| JP | 2003520301 A | 7/2003 |
| JP | 2003253121 A | 9/2003 |
| JP | 2003278083 A | 10/2003 |
| JP | 2003535767 A | 12/2003 |
| JP | 2006117823 A | 5/2006 |
| JP | 2007119974 A | 5/2007 |
| WO | WO 2008020635 A1 | 2/2008 |

OTHER PUBLICATIONS

English language translation and abstract for JP 11001876 extracted from PAJ database dated Jun. 1, 2009, 42 pages.
English language translation and abstract for JP 2003253121 extracted from PAJ database dated Jun. 1, 2009, 37 pages.
English language translation and abstract for JP2003278083 extracted from PAJ database dated Jun. 1, 2009, 44 pages.
English language abstract for JP 2003520301 extracted from espacenet.com database, dated May 29, 2009.
English language abstract for JP 2003535767 extracted from espacenet.com database, dated May 29, 2009.
English language translation and abstract for JP 2006117823 extracted from PAJ database dated Jun. 2, 2009, 36 pages.

(Continued)

*Primary Examiner* — Peter Y Choi
*Assistant Examiner* — Vincent A Tatesure
(74) *Attorney, Agent, or Firm* — Howard & Howard Attorneys PLLC

(57) ABSTRACT

A silicone-rubber composition for coating textile fabrics characterized in that the silicone-rubber composition comprises the following components: an alkenyl group-containing organopolysiloxane (A) that comprises a mixture of an organopolysiloxane (A-1) that contains in one molecule at least two alkenyl groups in the amount not exceeding 2 mass % and an organopolysiloxane (A-2) that contains in one molecule at least two alkenyl groups in amount of 5 mass % or more; an organohydrogenpolysiloxane (B) that comprises a mixture of an organohydrogenpolysiloxane (B-1) that has in one molecule on average three silicon-bonded hydrogen atoms and an organohydrogenpolysiloxane (B-2) that has in one molecule on average two silicon-bonded hydrogen atoms; a hydrosilylation catalyst (C); and a reinforcement fine silica powder (D); and elongation according to JIS K6251 of the cured product of the composition is equal to or greater than 800%.

7 Claims, No Drawings

(56) References Cited

OTHER PUBLICATIONS

English language translation and abstract for JP 2007119974 extracted from PAJ database dated Jun. 2, 2009, 52 pages.
English language abstract for WO 2008020635 extracted from espacenet.com database, dated Jun. 2, 2009.
PCT International Search Report for PCT/JP2007/065929, dated Dec. 4, 2007, 2 pages.
PCT International Search Report for PCT/JP2007/066058, dated Dec. 4, 2007, 2 pages.

* cited by examiner

SILICONE RUBBER COMPOSITION FOR COATING FOR WOVEN FABRIC, AND COATED WOVEN FABRIC

RELATED APPLICATIONS

This application claims priority to and all the advantages of International Patent Application No. PCT/JP2007/065929, filed on Aug. 9, 2007, which claims priority to Japanese Patent Application No. JP2006-221237, filed on Aug. 14, 2006.

TECHNICAL FIELD

The present invention relates to a silicone-rubber composition for coating textile fabrics and to a textile fabric coated with the silicone-rubber composition. More specifically, the invention relates to such a silicone-rubber composition for coating textile fabrics and to a textile fabric coated with a silicone-rubber composition, wherein the product material is capable of maintaining a pressure barrier between two areas with a pressure differential.

BACKGROUND ART

Silicone-based coating compositions for coating a textile fabric with silicone rubber are used in the industry, e.g., for automobile airbags. However, conventional silicone-rubber-coated textile fabrics are not quite satisfactory with regard to the demand for retaining a pressurized fluid during a relatively long time inside a sealed container made from a coated-fabric material. Such a demand has to be satisfied, e.g., for a side-curtain airbag of an automobile.

Japanese Unexamined Patent Application Publication (hereinafter referred to as "Kokai") H11-1876 proposes to use a textile fabric coated with a first layer placed onto a textile fabric and formed from a silicone elastomer composition having elongation equal to or greater than 400% and with a second layer, which is laminated onto the first layer and has a tear strength equal to or greater than 30 kN/m. However, the above-described coated fabric still does not completely satisfy the aforementioned demands. Provision of two layers either makes the manufacturing process complicated and the product expensive, or increases the weight of the coated textile fabric. Furthermore, the aforementioned patent publication does not teach a silicone elastomer composition that has a elongation greater than 600%.

Kokai 2003-520301 discloses a composition for coating textile fabrics which is hydrosilylation reaction-curable and consists of polyorganosiloxanes of three types, two of which are alkenyl-containing polyorganosiloxanes having two different specific viscosities and a third one has alkenyl groups on molecular terminals and in side chains. Furthermore, Kokai 2003-278083 discloses a silicone composition for coating an airbag base fabric consisting of two alkenyl-containing polyorganosiloxanes of different specific viscosities and a vinyl-containing organopolysiloxane resin. However, both these compositions do not sufficiently satisfy the aforementioned demands, and neither of the two last-mentioned patent publications teaches a fabric-coating composition having a elongation that exceeds 600%.

DISCLOSURE OF INVENTION

The present invention is aimed at a solution of the above problems. It is an object of the present invention to provide a coated textile fabric capable of maintaining a pressure barrier between two areas with pressure differential for a relatively long time. It is another object to provide a silicone-rubber composition suitable for forming such a coated textile fabrics.

The above objects are achieved by the present invention that comprises the following:

[1] A silicone-rubber composition for coating textile fabrics characterized in that elongation according to JIS K6251 of the cured product of the composition is equal to or greater than 800%.

[2] A silicone-rubber composition for coating textile fabrics characterized in that the silicone-rubber composition comprises the following components:

100 parts by mass of an alkenyl group-containing organopolysiloxane (A) that comprises a mixture of an organopolysiloxane (A-1) having in one molecule at least two alkenyl groups in an amount not exceeding 2 mass % and an organopolysiloxane (A-2) having in one molecule at least two alkenyl groups in amount of 5 mass % or more {this constituent is contained in an amount of 1 part by mass or less than 1 part by mass for 100 parts by mass of constituent (A-1), and the mole number of alkenyl groups contained in constituent (A-2) is 0.5 to 2 times the mole number of alkenyl groups contained in constituent (A-1)};

an organohydrogenpolysiloxane (B) that comprises a mixture of an organohydrogenpolysiloxane (B-1) having on average three silicon-bonded hydrogen atoms in one molecule and an organohydrogenpolysiloxane (B-2) having on average two silicon-bonded hydrogen atoms in one molecule {the constituents (B-1) and (B-2) are mixed in such a ratio that the mole ratio of silicon-bonded hydrogen atoms of constituent (B-1) to silicon-bonded hydrogen atoms of constituent (B-2) is in the range of (1.0:0) to (1.0:1.0)} [a mole ratio of silicon-bonded hydrogen atoms of constituent (B) to alkenyl groups of constituent (A) ranges from (0.9:1.0) to (2.5:1.0)];

a hydrosilylation catalyst (C) [in an amount required for curing the composition]; and 0.1 to 50 parts by mass of a reinforcing fine silica powder (D); and elongation according to JIS K6251 of the cured product of the composition is equal to or greater than 800%.

[3] A silicone-rubber composition for coating textile fabrics according to items [1] or [2] which is free of a solvent and comprises a solventless addition reaction-curable liquid silicone-rubber composition having a viscosity at 25° C. in the range of 100 to 500 Pa·s; and a silicone-rubber composition for coating textile fabrics according to item [2] wherein constituent (A-2) has a viscosity at 25° C. not exceeding 50 mPa·s.

[4] A coated textile fabric having a silicone-rubber coating layer comprising a cured product of the silicone-rubber composition for coating textile fabrics of items [1], [2], or [3].

[5] The coated textile fabric of item [4] for use as an airbag.

[6] A method of manufacturing a coated textile fabric comprising the steps of applying the fabric coating silicone-rubber composition of items [1], [2], or [3] onto a fabric; and then forming a silicone-rubber coating layer by curing the composition on the fabric.

The silicone-rubber composition for coating textile fabrics of the present invention can be applied onto a fabric and cured on the fabric for forming a silicone-rubber coating layer, whereby a coated textile fabric which is capable of maintaining a pressure barrier between two areas with pressure differential for a relatively long time is obtained. The coated textile fabric of the present invention is capable of maintaining a pressure barrier between two areas with pressure differential for a relatively long time.

BEST MODE FOR CARRYING OUT THE INVENTION

The following is a detailed description of the silicone-rubber composition of the present invention for coating textile fabrics.

The alkenyl group-containing organopolysiloxane (A) of the present invention constitutes one of the main components of the composition. The alkenyl groups of this component can be exemplified by vinyl, allyl, butenyl, pentenyl, hexenyl, and heptenyl groups, of which vinyl groups are preferable. Furthermore, silicon-bonded organic groups other than alkenyl groups contained in component (A) may be exemplified by methyl, ethyl, propyl, butyl, pentyl, hexyl, or similar alkyl groups; phenyl, tolyl, xylyl, or similar aryl groups; 3-chloropropyl, 3,3,3-trifluoropropyl, or similar halogen-substituted groups. Most preferable are methyl and phenyl groups. Furthermore, a small amount of hydroxyl groups, methoxy, ethoxy, or similar alkoxy groups can be contained on molecular terminals of component (A). This component consists of an organopolysiloxane (A-1) having at least two alkenyl groups in one molecule in an amount not exceeding 2 mass % and an organopolysiloxane (A-2) having at least two alkenyl groups in one molecule in amount of 5 mass % or more.

Constituent (A-1), which is one of the main constituents of component (A), comprises an organopolysiloxane that contains in one molecule at least two alkenyl groups in an amount not exceeding 2 mass %. The alkenyl groups and silicon-bonded organic groups other than alkenyl groups contained in this constituent are exemplified by the same respective groups that were given earlier. A small amount of hydroxyl groups, methoxy, ethoxy, or similar alkoxy groups can be contained on molecular terminals of this constituent. The content of alkenyl groups in constituent (A-1) should be less than 2 mass % and preferably should be in the range of 0.02 to 1.9 mass %. If the content of alkenyl groups in constituent (A-1) exceeds 2 mass %, then after curing the product may have impaired physical properties and the ability of maintaining a pressure barrier between two separated areas with a pressure differential across the textile fabric coated with the composition of the present invention will be insufficient. When constituent (A-1) comprises a mixture of several organopolysiloxanes having less than 2 mass % of alkenyl groups, it is preferable that on average the content of the alkenyl groups is in the range of 0.02 to 0.5 mass %.

Although it is recommended that constituent (A-1) should have a linear molecular structure, within the limits not interfering with the objects of the present invention, constituent (A-1) may have a partially branched molecular structure, or may be mixed with alkenyl group-containing organopolysiloxanes having a cyclic, branched, net-like, or dendritic structure. Also, there are no special restrictions with regard to viscosity of constituent (A-1) at 25° C. It may be recommended, however, that the viscosity of constituent (A-1) is in the range of 100 to 1,000,000 mPa·s, preferably in the range of 300 to 100,000 mPa·s.

Constituent (A-1) can be exemplified by the following compounds: a dimethylpolysiloxane capped at both molecular terminals with dimethylvinylsiloxy groups; a copolymer of a methylvinylsiloxane and a dimethylsiloxane capped at both molecular terminals with dimethylvinylsiloxy groups; a copolymer of a methylvinylsiloxane and a dimethylsiloxane capped at both molecular terminals with trimethylsiloxy groups; an organopolysiloxane consisting of $(CH_3)_2ViSiO_{1/2}$ siloxane units, $(CH_3)_3SiO_{1/2}$ siloxane units, and $SiO_{4/2}$ siloxane units (where Vi stands for vinyl groups); organopolysiloxanes of the aforementioned types where a part or all methyl groups are substituted with ethyl, propyl, or similar alkyl groups, phenyl, tolyl, or similar aryl groups; 3,3,3-trifluoropropyl, or similar halogenated alkyl groups; organopolysiloxanes of the aforementioned types where a part or all vinyl groups are substituted with allyl, propenyl, or similar alkenyl groups; or a mixture of two or more of the aforementioned organopolysiloxanes. Most preferable is the dimethylpolysiloxane capped at both molecular terminals with dimethylvinylsiloxy groups since this compound maintains the composition at low viscosity and imparts improved physical properties to products obtained after molding.

Constituent (A-2) is used for improving physical properties such as elongation of a produce obtained after curing, as well as for improving ability of the textile fabric coated with the composition of the present invention to maintain a pressure barrier across the coated textile fabric. This constituent comprises an organopolysiloxane that contains in one molecule at least two alkenyl groups in amount of 5 mass % or more. The alkenyl groups or silicon-bonded organic groups other than alkenyl groups can be exemplified by the same respective groups which have been mentioned earlier. Furthermore, molecular-chain terminals may contain hydroxyl groups, methoxy groups, ethoxy groups, or similar alkoxy groups. The content of alkenyl groups in constituent (A-2) should be equal to or greater than 5 mass %, preferably in the range of 8 to 50 mass %, and most preferably in the range of 8 to 40 mass %. If the content of alkenyl groups in constituent (A-2) is below 5 mass %, this will lower mechanical properties, e.g., elongation, of the cured body and will not provide the textile fabric coated with the composition with sufficient ability of maintaining a pressure barrier across the coated fabric.

Constituent (A-2) may have a linear, cyclic, branched, net-like, dendritic molecular structure, or a combination of two or more of the aforementioned structures. There are no special restrictions with regard to viscosity of constituent (A-2) at 25° C. However, it can be to have viscosity of this constituent not exceeding 50 mPa·s, preferably in the range of 0.1 to 40 mPa·s, and most preferably in the range of 1 to 40 mPa·s. If viscosity of constituent (A-2) is in the rage of the aforementioned recommended range, physical properties of the product obtained by curing the composition may be further improved.

Constituent (A-2) can be exemplified by the following compounds: a dimethylsiloxane oligomer capped at both molecular terminals with dimethylvinylsiloxy groups; a methylvinylpolysiloxane capped at both molecular terminals with dimethylhydroxysiloxy groups; a copolymer of a methylvinyl siloxane and a dimethylsiloxane capped at both molecular terminals with dimethylhydroxysiloxy groups; a cyclic methylvinylpolysiloxane; a copolymer oligomer of a dimethylsiloxane and a methylvinylsiloxane capped at both molecular terminals with trimethylsiloxy groups; a methylvinylsiloxane oligomer capped at both molecular terminals with trimethylsiloxy groups; the aforementioned diorganopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; the diorganopolysiloxanes of the aforementioned types where a part or all vinyl groups are substituted with allyl, propenyl, or similar alkenyl groups; or a mixture of two or more of the aforementioned organopolysiloxanes. Most preferable are the following compounds: methylvinylpolysiloxane capped at both molecular terminals with dimethylhydroxysiloxy groups; a copolymer of a methylvinylsiloxane and a dimethylsiloxane capped at both molecular terminals with dimethylhydroxysiloxy groups; a cyclic methylvinylsiloxane; and a methylvinylsiloxane oligomer capped at both molecular terminals with trimethylsiloxy groups.

Constituent (A-2) is added to the composition in an amount equal to or less than 1 part mass, preferably 0.1 to 1 part by mass, for 100 parts by mass of constituent (A-1). If constituent (A-2) is added in an amount exceeding the recommended upper level, this will impair physical properties of the cured product, such as elongation, or the like, and will not provide sufficient ability of maintaining a pressure barrier across the coated fabric. The mole number of alkenyl groups contained in constituent (A-2) is 0.5 to 2, preferably 0.6 to 1.8, and most preferably, 0.9 to 1.4 times the mole number of alkenyl groups contained in constituent (A-1). If the ratio of the mole number of alkenyl groups in constituent (A2) relative to the mole number of alkenyl groups in constituent (A-1) is less than the recommended lower limit, this will impair physical properties of the cured product, such as elongation, or the like, and will not provide sufficient ability of maintaining a pressure barrier across the coated fabric. If, on the other hand, the ratio of the mole number of alkenyl groups in constituent (A2) relative to the mole number of alkenyl groups in constituent (A-1) exceeds the recommended upper limit, this will impair not only physical properties of the cured product such as elongation but also an adhesive strength of the composition and ability to maintain a pressure barrier across the coated fabric.

Component (B) is a curing agent which reacts with component (A) and cross-links the composition in the presence of hydrosilylation catalyst (C), which is described below. Silicon-bonded organic groups contained in component (B) can be exemplified by methyl, ethyl, propyl, butyl, pentyl, hexyl, or similar alkyl groups; phenyl, tolyl, xylyl, or similar aryl groups; 3-chloropropyl, 3,3,3-trifluoropropyl, or similar halogen-substituted groups. Most preferable are methyl and phenyl groups. Component (B) comprises an organohydrogenpolysiloxane (B-1) that has in one molecule on average three silicon-bonded hydrogen atoms, or a mixture of organopolysiloxane (B-1) with an organohydrogenpolysiloxane (B-2) that has in one molecule on average two silicon-bonded hydrogen atoms. Component (B) is used in such an amount that the mole ratio of silicon-bonded hydrogen atoms of component (B) to alkenyl groups of component (A) ranges from (0.9:1.0) to (2.5:1.0). It is preferable that this mole ratio ranges from (0.9:1.0) to (2.0:1.0), and most preferably from (0.9:1.0) to (1.5:1.0). If the content of component (B) is below the recommended lower limit, the composition will not be cured to a sufficient degree, and the cured layer of the composition will not reliably adhere to the surface of the textile fabric. If, on the other hand, the content of component (B) exceeds the recommended upper limit, this will impair physical properties of the cured product, such as elongation, or the like.

There are no special restrictions with regard to the molecular structure of constituent (B-1) which may comprise a resinous substance having a linear, branched, cyclic, or a three-dimensional net-like molecular structure. Also there are no special restrictions with regard to viscosity of constituent (B-1) but it may be recommended to have viscosity of this constituent in the range of 1 to 1,000,000 mPa·s at 25° C. Constituent (B-1) can be exemplified by the following compounds: a methylhydrogenpolysiloxane capped at both molecular terminals with trimethylsiloxy groups; a copolymer of a methylhydrogensiloxane and a dimethylsiloxane capped at both molecular terminals with trimethylsiloxy groups; a copolymer of a methylhydrogensiloxane and a dimethylsiloxane capped at both molecular terminals with dimethylhydrogensiloxy groups; a copolymer of a methylhydrogensiloxane and a methylphenylsiloxane capped at both molecular terminals with dimethylphenylsiloxy groups; a cyclic methylhydrogenpolysiloxane; a copolymer consisting of $(CH_3)_2HSiO_{1/2}$ siloxane units, $(CH_3)_3SiO_{1/2}$ siloxane units, and $SiO_{4/2}$ units; a copolymer consisting of $(CH_3)_2HSiO_{1/2}$ siloxane units and $SiO_{4/2}$ units; the aforementioned organopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned organopolysiloxanes. Normally, the aforementioned organohydrogenpolysiloxanes have viscosity in the range of 1 to 500 mPa·s.

When component (B) contains both constituents (B-1) and (B-2), this improves physical properties of the composition and adhesion of the composition to textile fabric. Constituent (B-2) can be exemplified by the following compounds: a copolymer of a methylhydrogensiloxane and a dimethylsiloxane capped at both molecular terminals with trimethylsiloxy groups and having in one molecule on average at least two silicon-bonded hydrogen atoms; a dimethylpolysiloxane capped at both molecular terminals with dimethylhydrogensiloxy groups; the aforementioned organopolysiloxanes in which a part or all methyl groups are substituted with ethyl, propyl, or similar alkyl groups; phenyl, tolyl, or similar aryl groups; 3,3,3-trifluoropropyl, or similar halogenated alkyl groups; or a mixture of two or more of the aforementioned organopolysiloxanes.

When component (B) is composed of both constituents (B-1) and (B-2) used together, the ratio of the mole number of silicon-bonded hydrogen atoms of constituent (B-1) to silicon-bonded hydrogen atoms of constituent (B-2) should not exceed 1:1, and preferably should be in the range of (1.0:0.05) to (1.0:0.7), and most preferably in the range of 1:0.1 to 1:0.5. If the content of constituent (B-2) exceeds the recommended upper limit, it will be difficult to provide complete curing of the composition.

Hydrosilylation catalyst (C) is used for accelerating a reaction between the alkenyl groups of component (A) and the silicon-bonded hydrogen atoms of component (B). A preferable component (C) is a platinum-system catalyst which is efficient in its catalytic action and is relatively easily available. Such platinum-system catalysts can be exemplified by the following substances: a finely powdered platinum; a chloroplatinic acid or an alcohol solution of a chloroplatinic acid; an olefin complex of a chloroplatinic acid; a complex of a chloroplatinic acid and an alkenylsiloxane; a platinum-diketone complex; metallic platinum on silica, alumina, carbon or a similar carrier; or a thermoplastic resin powder that contains a platinum compound. The catalysts other than those belonging to the platinum-base group can be exemplified by rhodium, ruthenium, iridium, or palladium compounds. For example, these catalysts can be represented by the following formulas: $RhCl(PPh_3)_3$, $RhCl(CO)(PPh_3)_2$, $Ru_3(CO)_{12}$, $IrCl(CO)(PPh_3)_2$, and $Pd(PPh_3)_4$ (where Ph stands for a phenyl group).

Component (C) is added in an amount of 0.1 to 500 parts by mass, preferably 1 to 50 parts by mass of metallic platinum for $10^6$ parts by mass of component (A). If the added amount of component (C) is below the recommended lower limit, the reaction will not have a sufficient progress, and if, on the other hand, the added amount exceeds the recommended upper limit, this will be economically unjustifiable.

Reinforcing fine silica powder (D) is a component which is added for improving mechanical strength of a molded silicone rubber product obtained by curing the aforementioned addition reaction-curable liquid silicone-rubber composition. This component can be exemplified by dry-process silica or the aforementioned silica having its surface hydrophobically treated, e.g., with an organic silicon compound. It is recommended that the specific surface area of this reinforcement fine silica powder be equal to or exceed 50 $m^2/g$. The reinforcement fine silica powder can be added to the composition in an amount of 0.1 to 50 parts by mass, preferably 5 to 40 parts by mass for 100 parts by mass of component (A).

In order to improve storage stability and industrial handleability, the composition may incorporate such compounds as 2-methyl-3-butyn-2-ol, 3,5-dimethyl-1-hexyn-3-ol, 3,5-dimethyl-1-octyn-3-ol, 2-phenyl-3-butyn-2-ol, or similar acetylene-based compounds; 3-methyl-3-penten-1-yne, 3,5-dimethyl-3-hexen-1-yne, or a similar enyne compound; phosphine, mercaptane, hydrazine, or similar curing retarding agents. There are no special restrictions with regard to amounts in which these compounds can be used, but in general they should be added in an amount of 0.001 to 5 parts by mass for 100 parts by mass of component (A). Most preferably, the curing retarding agents should be added in an amount ranging from 0.01 to 10 parts by mass.

The aforementioned composition can be additionally combined with the following compounds: an adhesion promoter such as an organic titanic acid ester, or a similar titanium compound; a titanium chelate compound, aluminum chelate compound, zirconium chelate compound, or a similar metal chelate compound; an epoxy-containing organoalkoxysilane, acryloxy-containing organoalkoxysilane, or a methacryloxy-containing organoalkoxysilane. The metal-chelate compounds and the organoalkoxysilane compounds can be used in combinations. Most preferable from the viewpoint of improved adhesion is a combination of the methacryloxy-containing organoalkoxysilane and the zirconium-chelate compound or a combination of the methacryloxy-containing organoalkoxysilane compound, the epoxy-containing organoalkoxysilane compound, and the zirconium-chelate compound. The adhesion promoter can be added in the amount of 0.05 to 5 parts by mass, preferably 0.1 to 2 parts by mass for 100 parts by mass of component (A).

Within the limits which are not in contradiction with the objects of the present invention, the composition may be further combined with conventional additives normally added to silicone-rubber compositions such as a quartz powder, diatomaceous earth, calcium carbonate, magnesium carbonate, or similar weight-increasing fillers; a cerium oxide, cerium hydroxide, ferric oxide, or similar heat-resistant additives; Bengala, titanium oxide, carbon black, or similar pigments; a flame retarder; and an organopolysiloxane resin that does not have alkenyl groups and does not have a softening point.

Preferably, the composition of the present invention may have a viscosity in the range of 100 to 500 Pa·s at 25° C. In particular, the composition may comprise a solventless fabric-coating silicone-rubber composition that does not need the use of a solvent for viscosity adjustment. Most preferable is a hydrosilylation reaction-curable liquid silicone-rubber composition having viscosity in the range of 100 to 500 Pa·s, in particular a solventless hydrosilylation-curable liquid silicone-rubber composition having viscosity in the range of 100 to 300 Pa·s. This composition possesses excellent properties for application onto a textile fabric and forms a crack-resistant coating layer on the fabric.

There are no special restrictions with regard to the method suitable for the preparation of the silicone-rubber composition of the present invention, and the composition can be prepared by mixing components (A) through (D), if necessary, with other arbitrary components. However, a silica master batch can be first prepared by heating and mixing a part of component (A) with component (D) and then adding to this master batch the remaining part of component (A) and components (B) and (C). If the composition contains arbitrary components, they can be admixed with other components during the preparation of the silica master batch. If heating of these arbitrary components change their properties, preferably, they can be combined with the silica master batch together with the remaining part of component (A) and components (B) and (C). Furthermore, when preparing the silica master batch, the aforementioned organic silicon compound can be added into the mixture and component (D) can be surface-treated in-situ. The composition can be prepared by using a two-roll mill, a kneader-mixer, Ross mixer, or any other conventional kneading or mixing equipment.

For better storage stability, the silicone-rubber composition of the present invention may comprise a two-part liquid composition which consists of a composition (I) that comprises components (A), (C), and (D) without component (B) and a composition (II) that comprises component (A), (B), and (D) without component (C).

The coated textile fabric of the present invention is formed by coating a textile fabric with a coating layer made from the silicone-rubber composition of the present invention. Among the physical properties obtained in the cured product after curing of the composition, elongation according to JIS K6251 should be equal to or greater than 800% and, preferably, greater than 900%. If elongation of a cured product of the aforementioned silicone-rubber composition is less than 800%, the textile fabric coated with the cured layer of the composition will not be able to reliably maintain the pressure barrier between two areas with a pressure differential.

It is especially preferable to have elongation according to JIS K6251 greater than 800% when the coating silicone rubber layer is located on the low-pressure side.

The coated textile fabric of the present invention comprises a textile fabric coated with the silicone-rubber composition described above. A textile fabric may comprise Nylon 6, Nylon 66, Nylon 46, or a similar polyamide-fiber textile fabric; polyethylene-terephthalate, polybutylene-terephthalate, or a similar polyester-fiber textile fabric; polyacrylonitrile-fiber textile fabric, aramid-fiber textile fabric, polyetherimide textile fiber fabric, polysulfone-based-fiber textile fabric, carbon-fiber textile fabric, rayon-fiber textile fabric, polyethylene-fiber textile fabric, or a nonwoven fabric made from the aforementioned fibers. Among the above textile fabrics, most preferable from the viewpoint of low cost and strength are polyamide-fiber textile fabrics or polyester-fiber textile fabrics. Prior to coating with the composition of the present invention, the textile fabric is washed with water and dried.

Although there are no special restrictions with regard to the fabric structure, for the sake of better productivity and desired thickness, normally this should be a flat textile fabric but it also may have a hollow woven structure having an envelope woven into that the fabric structure. In the case of the aforementioned hollow woven textile fabric structure, the coating is applied onto the outer surface of the fabric. However, since the silicone-rubber layer obtained by curing the silicone-rubber composition of the present invention possesses excellent elongation the material of the bag may maintain a pressure barrier for a relatively long time even when the interior of the bag is inflated with a fluid under a high pressure.

A method of application of the silicone-rubber composition of the present invention onto the textile fabric may comprise spraying, gravure coating, bar coating, knife coating, patting, screen printing, dipping, or any other conventional processes. The coating amount of the composition may be in the range of 25 to 150 g/m$^2$. Curing of the composition applied onto the textile fabric may be carried out at a temperature of 150 to 200° C. and the curing time at that temperature is about 1 to 2 min.

Normally, the fabric coating layer of the composition of the present invention comprises a single layer. If necessary, however, an arbitrary number of layers can be formed on the fabric. Such additional layers are applied either for improving tactile sensation, for improving wear-resistant properties of the material, or for improving strength of the coated product. The additional coating layer may be exemplified by a plastic film, a textile fabric, non-woven fabric, or a layer from any other elastic coating material.

EXAMPLES

The invention will be further described with reference to practical examples, wherein all parts are parts by mass and all viscosities are measured at 25° C. In the examples, Me designates methyl groups, and Vi designates vinyl groups.

[Methods for Measuring Physical Properties of Silicone Rubber]

A 2 mm-thick cured silicone rubber specimen was produced by subjecting the silicone-rubber composition to press curing for 5 min at 150° C. under a pressure of 20 MPa. Hardness of the silicone rubber was measured by type A durometer in accordance with JIS K6253. Tensile strength, elongation, and tear strength were measured in accordance with JIS K6251 and JIS K 6252. Furthermore, the stress that occurred at 100% elongation was measured as 100% modulus in accordance with JIS 6251.

[Method for Measuring Adhesive Strength]

A Nylon 66 fabric having 46 threads/inch warp density and 46 threads/inch weft density was coated with a 1 mm-thick layer of the silicone-rubber composition, another piece of a Nylon 66 fabric having 46 threads/inch warp density and 46 threads/inch weft density was adhesively attached to the surface of the first fabric, and then the silicone-rubber composition sandwiched between the fabric pieces was cured for 2 min at 180° C. The obtained adhesion sample was cut into 50 mm-wide strips for obtaining adhesive-strength test specimens. The adhesive strength was then measured by stretching the two Nylon fabric pieces interconnected through the cured layer of silicone rubber in opposite directions (i.e., at an angle of 180°) with the stretching speed of 500 mm/min

[Method of measuring Adhesion Durability]

A piece of Nylon 66 fabric having a warp density of 46 threads/inch, a weft density of 46 threads/inch, and a continuous yarn density of 470 dtex which was cut out from the central part of a hollow woven fabric structure with a A-4 size envelope woven into that the textile structure was coated with a 50 μm-thick layer of the silicone-rubber composition. And a silicone-rubber-coated fabric was formed by holding the fabric coated with the composition for 2 min in a heating furnace at 180° C. The obtained silicon-rubber-coated fabric was subjected to 1000 loading cycles using a Scott tester with a load of 1 kgf, and then the condition the surface of the silicone-rubber-coating layer was observed. The surface which did not contain any changes was evaluated with grade 5, the surface that contained slight stripe-like marks was evaluated with grade 4, the fabric with slight and partial peeling of the silicone-rubber-coating layer was evaluated with grade 3, the fabric with noticeable partial peeling of the silicone-rubber-coating layer was evaluated with grade 2, and the fabric with significant peeling of the silicone-rubber-coating layer over the entire surface of the fabric was evaluated with grade 1. The same adhesion durability test by using a Scott tester was conducted and the same evaluations criteria were used as those mentioned before for a silicone-rubber-coated fabric manufactured by the same method as described above but after retaining the fabric for 10 days under conditions of 80° C. temperature and 95% Rh humidity.

[Method of Measuring Property to Hold Inner Pressure]

A Nylon 66 hollow woven fabric structure with a A-4 size envelope having a warp density of 46 threads/inch, a weft density of 46 threads/inch, and a continuous yarn density of 470 dtex was coated from both sides with a silicone-rubber composition in coating amounts shown in Table 1. And the silicone-composition coating layer was cured by heating for 2 min at 180° C., whereby a silicone-rubber-coated fabric was formed. The inner cavity of the obtained coated hollow woven textile fabric was inflated through an air-inlet port with compressed air under pressure of 300 kPa to an inner pressure of 190 kPa. The air-inlet port was then sealed, and the property of the fabric to hold the inner pressure was evaluated as the time required for a drop of the inner pressure to the level of 50 kPa.

Manufacturing Example 1

A Ross mixer was filled with the following components: 100 parts by mass of a dimethylpolysiloxane (that corresponds to component (a-1) in Table 1) which is capped at both molecular terminals with dimethylvinylsiloxy groups and has a viscosity of 40,000 mPa·s; 60 parts by mass of a wet-process silica (Nipsil LP; the product of Nippon Silica Co., Ltd.); 9.7 parts by mass of a hexamethyl disilazane; 4.4 parts by mass of water; and 0.7 parts by mass of a copolymer of a methylvinylsiloxane and a dimethylsiloxane capped at both molecular terminals with dimethylhydroxysiloxy groups and having a viscosity of 20 mPa·s (10.9 mass % content of vinyl groups; corresponds to component (a-6) in Table 1). After the components were mixed to uniformity at room temperature the obtained mixture was heat treated for 2 hours at 200° C. under a reduced pressure, whereby a flowable Silica Master Batch 1 was produced.

Manufacturing Example 2

A Ross mixer was filled with the following components: 100 parts by mass of a dimethylpolysiloxane which is capped at both molecular terminals with dimethylvinylsiloxy groups and has a viscosity of 40,000 mPa·s; 40 parts by mass of fumed silica having the BET specific area of 225 m$^2$/g; 7 parts by mass of a hexamethyldisilazane; 2 parts by mass of water; and 0.2 parts by mass of a copolymer of a methylvinylsiloxane and a dimethylsiloxane capped at both molecular terminals with dimethylhydroxysiloxy groups and having a viscosity of 20 mPa·s (10.9 mass % content of vinyl groups; corresponds to component (a-6) in Table 1). After the components were mixed to uniformity at room temperature the obtained mixture was heat treated for 2 hours at 200° C. under a reduced pressure, whereby a flowable Silica Master Batch 2 was produced.

Practical Examples 1 to 3; Comparative Examples 1 and 2

Silicone-rubber compositions were prepared by uniformly mixing various components in the amounts shown in Table 1.

Physical characteristics of the obtained silicone-rubber compositions, their adhesive strength, Scott test characteristics, and ability of the coated fabric to hold inner pressure were measured. The results are shown in Table 1.

The components of Table 1 are described below. The (Vi content of A-2)/(Vi content of A-1) shown in Table 1 is the ratio of the total amount of vinyl groups contained in constituent (A-2) to the total amount of vinyl groups contained in constituent (A-1), the constituents (A-1) and (A-2) being described below. Vinyl groups contained in the silica master batches are also included into the aforementioned quantities.

Silica Master Batches

Base 1: Silica Master Batch 1 prepared in Manufacturing Example 1. This master batch contains about 36 mass % of wet-process silica; 100 parts by mass of Silica Master Batch 1 contains 62 parts by mass of constituent (a-1), 0.4 parts by mass of constituent (a-6), and 37 parts by mass of component (D) which is a wet-process silica, constituents (a-1) and (a-6) being described below.

Base 2: Silica Master Batch 2 prepared in Manufacturing Example 2. 100 parts by mass of Silica Master Batch 2 contains 71 parts by mass of constituent (a-1), 0.1 parts by mass of constituent (a-6), and 29 parts by mass of component (D) which is a fumed silica, constituents (a-1) and (a-6) being described below.

Constituent (A-1)

(a-1): a dimethylpolysiloxane that has a viscosity of 40,000 mPa·s and is capped at both molecular terminals with dimethylvinylsiloxy groups; content of vinyl groups is about 0.09 mass %.

(a-2): a dimethylpolysiloxane that has a viscosity of 2,000 mPa·s and is capped at both molecular terminals with dimethylvinylsiloxy groups; content of vinyl groups is about 0.23 mass %.

(a-3): a copolymer of methylvinylsiloxane and dimethylsiloxane that has a viscosity of 350 mPa·s and is capped at both molecular terminals with dimethylvinylsiloxy groups; content of vinyl groups is about 1.17 mass %.

(a-4): an organopolysiloxane of the following formula: $(Me_3SiO_{1/2})_n$ $(Me_2ViSiO_{1/2})m$ $(SiO_{4/2})_r$, number-average molecular weight=4300; vinyl group content=1.9 mass %; $(n+m)/r=0.71$.

Constituent (A-2)

(a-5): a cyclic methylvinylpolysiloxane that has a viscosity of 3.5 mPa·s; content of vinyl groups is about 30.7 mass %.

(a-6): a copolymer of methylvinylsiloxane and dimethylsiloxane that has a viscosity of 20 mPa·s and is capped at both molecular terminals with dimethylvinylsiloxy groups; content of vinyl groups is about 10.9 mass %.

Component (B)

(b-1): a copolymer of methylhydrogensiloxane and dimethylsiloxane that has a kinematic viscosity of 5.5 $mm^2$/s and is capped at both molecular terminals with trimethylsiloxy groups; content of silicon-bonded hydrogen atoms is about 0.73 mass %.

(b-2): a dimethylpolysiloxane that has a kinematic viscosity of 9.5 $mm^2$/s and is capped at both molecular terminals with dimethylhydrogensiloxy groups; content of silicon-bonded hydrogen atoms is about 0.16 mass %.

(b-3) a methylhydrogenpolysiloxane that has a kinematic viscosity of 23.5 $mm^2$/s and is capped at both molecular terminals with trimethylsiloxy groups; content of silicon-bonded hydrogen atoms is about 1.6 mass %.

Component (C)

Platinum catalyst: a 1,3-divinyltetramethyldisiloxane solution of a platinum complex of 1,3-divinyltetramethyldisiloxane; content of metallic platinum is about 4000 ppm.

Adhesion Promoter

AD-1: 3-glycidoxypropyl trimethoxysilane

AD-2: 3-methacryloxypropyl trimethoxysilane

AD-3: a mixture of 50 parts by weight of a zirconium tetracetylacetonate with 50 parts by mass of a dimethylpolysiloxane that has a viscosity of 400 mPa·s and is capped at both molecular terminals with dimethylvinylsiloxy groups.

Curing Inhibitor

Inh-1: a mixture of 2 parts by mass of an ethynylcyclohexanol with 98 parts by mass of a dimethylpolysiloxane that has a viscosity of 10,000 mPa·s and is capped at both molecular terminals with dimethylvinylsiloxy groups.

Inh-2: 3,5-dimethyl-1-octyn-3-ol.

TABLE 1

| | | Pr. Ex. 1 | Pr. Ex. 2 | Pr. Ex. 3 | Comp. Ex. 1 | Comp. Ex. 2 |
|---|---|---|---|---|---|---|
| Silica Master Batch | base 1 | 53 | | | 57 | |
| | Base 2 | | 61.5 | 65 | | 60 |
| A-1 | a-1 | 40 | 35 | 25 | 30 | 15 |
| | a-2 | | | | | 6.5 |
| | a-3 | | | 3 | 6 | 3 |
| | a-4 | | | | | 8.5 |
| A-2 | a-5 | 0.1 | 0.2 | 0.2 | | |
| | a-6 | | 0.15 | 0.15 | | 0.15 |
| (Vi content of A-2)/(Vi content of A-1) | | 0.9 | 1.3 | 0.9 | | 0.3 |
| B | b-1 | 4.3 | 1.5 | 1.9 | 4.68 | 3.1 |
| | b-2 | | | 1.9 | | 3 |
| (C) | Platinum catalyst | 0.15 | 0.2 | 0.2 | 0.15 | 0.2 |
| Adhesion promoter | AD-1 | | 0.6 | 0.6 | | 0.6 |
| | AD-2 | | 0.5 | 0.5 | | 0.5 |
| | AD-3 | | 0.2 | 0.1 | | 0.2 |
| Curing inhibitor | Inh-1 | 2 | | | 2.5 | |
| | Inh-2 | | 0.04 | 0.04 | | 0.04 |
| Viscosity | Pa·s | 128 | 120 | 120 | 146 | 125 |
| Hardness | | 13 | 29 | 27 | 24 | 26 |
| Density | g/$cm^3$ | 1.09 | 1.09 | 1.10 | 1.09 | 1.10 |
| Tensile strength | MPa | 8.2 | 10 | 10 | 8.1 | 8 |
| 100% modulus | MPa | 0.20 | 0.44 | 0.39 | 0.40 | 1.10 |
| Elongation | % | 1260 | 940 | 1000 | 750 | 650 |
| Tear strength | N/mm | 19 | 36 | 33 | 20 | 33 |

TABLE 1-continued

| | | Pr. Ex. 1 | Pr. Ex. 2 | Pr. Ex. 3 | Comp. Ex. 1 | Comp. Ex. 2 |
|---|---|---|---|---|---|---|
| Adhesive strength | N/cm | 28 | 40 | 55 | 20 | 55 |
| Scott test | Initial | 5 | 5 | 5 | 5 | 5 |
| | After heating in humid condition | 3 | 5 | 5 | 1 | 5 |
| Inner pressure holding properties | Coating amount 100 g/m² | 100 | | | 45 | |
| | Coating amount 65 g/m² | | | 60 | 18 | 46 |
| | Coating amount 60 g/m² | | 60 | | | |

Comparison between Practical Examples 1 to 3 and Comparative Examples 1 and 2 shows that the silicone-rubber compositions for coating textile fabrics that provide elongation according to JIS K6251 which is equal to or greater than 800% impart to the inner pressure holding properties superior to those of the compositions of the comparative examples that provide elongation according to JIS K6251 which is lower than 800%.

Comparison between Practical Examples 2 and 3 and Comparative Examples 1 and 2 shows that the silicone-rubber compositions for coating textile fabrics that provide an elongation according to JIS K6251 which is equal to or greater than 800%, along with better inner pressure holding properties of the coated fabric, also require the composition for coating textile fabrics in an amount smaller than the aforementioned composition with an elongation according to JIS K6251 lower than 800%.

Comparison between Practical Examples 1 to 3 and Comparative Examples 1 and 2 shows that the fabric-coating silicone-rubber compositions for coating textile fabrics that have a ratio of the mole number of alkenyl groups of constituent (A-2) to the mole number of alkenyl groups of constituent (A-1) equal to or greater than 0.5 provides elongation and the inner pressure holding properties of the coated fabric which are superior to similar characteristics of the silicone-rubber compositions that have a ratio of the mole number of alkenyl groups of constituent (A-2) to the mole number of alkenyl groups of constituent (A-1) lower than 0.5.

Comparison between Practical Examples 2 and 3 and Comparative Examples 1 and 2 shows that the silicone-rubber compositions for coating textile fabrics that have a ratio of the mole number of alkenyl groups of constituent (A-2) to the mole number of alkenyl groups of constituent (A-1) equal to or greater than 0.5, along with better inner pressure holding properties of the coated fabric, also require the composition for coating textile fabrics in an amount smaller than the aforementioned composition with a ratio of the mole number of alkenyl groups of constituent (A-2) to the mole number of alkenyl groups of constituent (A-1) lower than 0.5.

INDUSTRIAL APPLICABILITY

The silicone-rubber composition of the present invention is suitable for use as a fabric coating composition since it allows the fabric to maintain a pressure barrier between two areas with a pressure differential over a relatively long time. Therefore, the composition can be used for coating textile fabrics utilized in the structure of vehicle side curtain airbags, aircraft emergency exit seats, inflatable rafts, or the like. The coated fabric of the present invention may find application in the structure of vehicle side curtain airbags, aircraft emergency exit seats, inflatable rafts, etc.

The invention claimed is:

1. A silicone-rubber composition for coating textile fabrics characterized in that the silicone-rubber composition comprises the following components:
   100 parts by mass of an alkenyl group-containing organopolysiloxane (A) that comprises a mixture of an organopolysiloxane (A-1) having in one molecule at least two alkenyl groups in an amount not exceeding 2 mass % and an organopolysiloxane (A-2) that contains in one molecule at least two alkenyl groups in an amount of 5 mass % or more, wherein the constituent (A-2) is contained in the amount of 1 part by mass or less than 1 part by mass for 100 parts by mass of constituent (A-1), and wherein the mole number of alkenyl groups contained in constituent (A-2) is 0.5 to 2 times the mole number of alkenyl groups contained in constituent (A-1);
   an organohydrogenpolysiloxane (B) that comprises a mixture of an organohydrogenpolysiloxane (B-1) that has on average three silicon-bonded hydrogen atoms in one molecule and an organohydrogenpolysiloxane (B-2) that has on average two silicon-bonded hydrogen atoms in one molecule, wherein the constituents (B-1) and (B-2) are mixed in such a ratio that the mole ratio of silicon-bonded hydrogen atoms of constituent (B-1) to silicon-bonded hydrogen atoms of constituent (B-2) is in the range of (1.0:0) to (1.0:1.0), and wherein the mole ratio of silicon-bonded hydrogen atoms of constituent (B) to alkenyl groups of constituent (A) ranges from (0.9:1.0) to (2.5:1.0);
   a hydrosilylation catalyst (C) in an amount required for curing the composition;
   0.1 to 50 parts by mass of a reinforcement fine silica powder (D); and
   an adhesion promoter selected from the group consisting of: a combination of a methacryloxy-containing organoalkoxysilane compound and a zirconium-chelate compound; and a combination of a methacryloxy-containing organoalkoxysilane compound, an epoxy-containing organoalkoxysilane compound, and a zirconium-chelate compound, wherein the adhesion promoter is present in an amount of 0.05 to 5 parts by mass per 100 parts by mass of component (A);
   wherein elongation according to JIS K6251 of the cured product of the composition is equal to or greater than 800%;
   and wherein the silicone-rubber composition has a viscosity at 25° C. in the range of 100 to 500 Pa·s.

2. The silicone-rubber composition for coating textile fabrics according to claim 1, wherein viscosity of constituent (A-2) at 25° C. does not exceed 50 mPa·s.

3. The silicone-rubber composition for coating textile fabrics according to claim 1, which is free of a solvent.

4. A coated textile fabric having a silicone-rubber coating layer comprising a cured product of the silicone-rubber composition for coating textile fabrics according to claim 1.

5. The coated textile fabric of claim 4 as a material for an airbag.

6. The coated textile fabric according to claim 4, wherein the textile fabric has a hollow woven structure.

7. A method of manufacturing a coated textile fabric comprising the steps of applying the silicone-rubber composition for coating textile fabrics according to claim 1 onto a textile fabric; and then forming a silicone-rubber coating layer by curing the composition on the textile fabric.

* * * * *